United States Patent
Huang

(10) Patent No.: US 8,805,139 B2
(45) Date of Patent: Aug. 12, 2014

(54) OPTICAL WAVEGUIDE DIRECTIONAL COUPLER AND METHOD FOR MAKING SAME

(71) Applicant: Hsin-Shun Huang, New Taipei (TW)

(72) Inventor: Hsin-Shun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/660,007

(22) Filed: Oct. 25, 2012

(65) Prior Publication Data
US 2013/0287340 A1   Oct. 31, 2013

(30) Foreign Application Priority Data
Apr. 27, 2012   (TW) .............................. 101115057 A

(51) Int. Cl.
G02B 6/26   (2006.01)

(52) U.S. Cl.
USPC .............................................. 385/42; 385/45

(58) Field of Classification Search
USPC ...................................................... 385/42, 45
See application file for complete search history.

(56) References Cited

U.S. PATENT DOCUMENTS 5,127,081 A * 6/1992 Koren et al. ................... 385/130
5,483,609 A * 1/1996 Nakaya ........................... 385/29

* cited by examiner

Primary Examiner — Omar Rojas
(74) Attorney, Agent, or Firm — Novak Druce Connolly Bove + Quigg LLP

(57) ABSTRACT

An optical waveguide directional coupler includes a base and a Y-shaped optical waveguide formed in the base. The base includes a planar member and a ridge member extending from a side of the planar member. The planar member includes a top surface. The ridge member includes a recessed planar portion and a raised portion raised relative to the recessed planar portion and perpendicularly extending from the planar member. The raised portion has an upper surface coplanar with the top surface. The Y-shaped optical waveguide is exposed to the upper surface and the top surface. One end of the Y-shaped optical waveguide is exposed to an end of the ridge member, and the other two ends are exposed to an end of the planar member.

7 Claims, 9 Drawing Sheets

US 8,805,139 B2

OPTICAL WAVEGUIDE DIRECTIONAL COUPLER AND METHOD FOR MAKING SAME

BACKGROUND

1. Technical Field

The present disclosure relates to an optical waveguide directional coupler and a method for making the optical waveguide directional coupler.

2. Description of Related Art

Optical waveguide directional couplers are used to couple light beams of different wavelengths into an optical fiber and divide light from the optical fiber into light beams of different wavelengths.

An optical waveguide directional coupler of related art includes a base and a Y-shaped planar optical waveguide. The base includes a planar member and a Y-shaped ridge member perpendicularly formed on the planar member using an etching process. The Y-shaped planar optical waveguide is formed in the Y-shaped ridge member and exposed at an upper surface of the Y-shaped ridge member.

In order to reduce light loss, the Y-shaped planar optical waveguide controls an included angle of ends of "Y" to within about 1 degree. That is, the Y-shaped ridge member also has to have an included angle of ends of "Y" to within about 1 degree. However, it is difficult to make the included angle to within about 1 degree of the Y-shaped ridge member by the etching process because the Y-shaped ridge member is always thick, such as 3-4 μm. This promotes various product defects, such as a split product or a product with an unwanted angle.

Therefore, it is desirable to provide an optical waveguide directional coupler and a method for making same, which can overcome or alleviate the above-mention problems.

DETAILED DESCRIPTION

Figure 1:
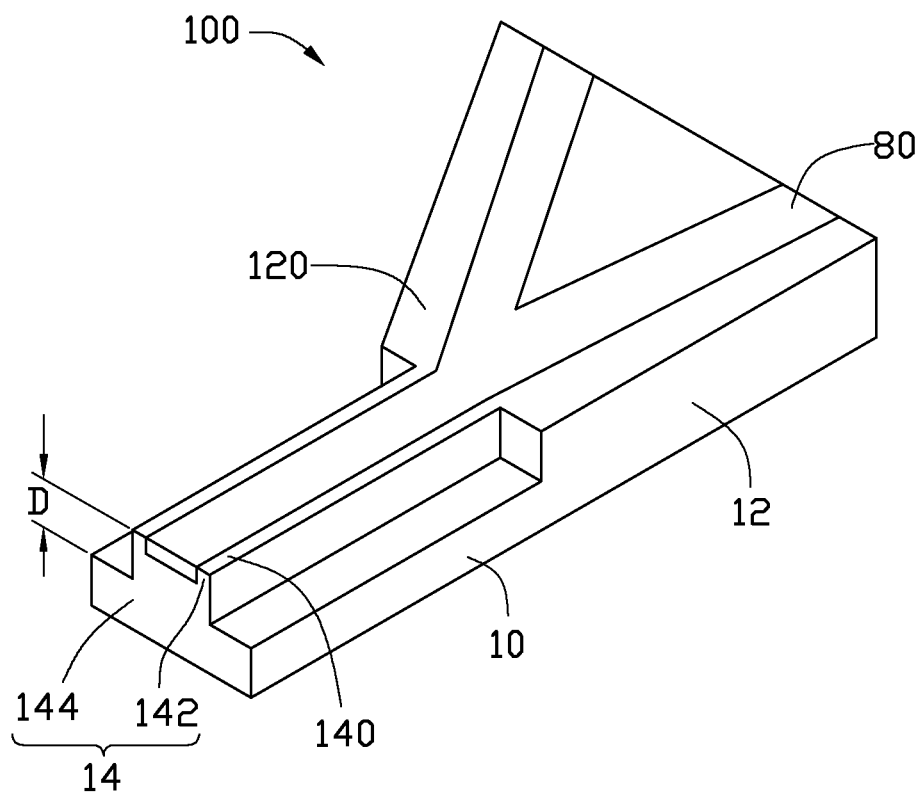
FIG. 1 is a schematic, isometric view of an optical waveguide directional coupler, according to a first exemplary embodiment.

Referring to FIG. 1, an optical waveguide directional coupler 100, according to a first exemplary embodiment, is shown. The optical waveguide directional coupler 100 includes a base 10 and a Y-shaped optical waveguide 80 formed in the base 10.

The base 10 includes a planar member 12 and a ridge member 14 perpendicularly extending from a side of the planar member 12. The planar member 12 is a plate and includes a planar top surface 120. The ridge member 14 includes a raised portion 142 and a recessed planar portion 144. The raised portion 142 is elongated and raised relative to the recessed planar portion 144. The raised portion 142 perpendicularly extends from the recessed planar portion 144 and the planar member 12, and has a planar upper surface 140. The upper surface 140 is coplanar with the top surface 120. In this embodiment, the base 10 is made of a material selected from a group consisting of silicon and lithium niobate. The height D of the raised portion 142 relative to the recessed planar portion 144 is in a range from 3 μm to 4 μm.

The Y-shaped optical waveguide 80 is embedded in the base 10 and exposed to the upper surface 140 and the top surface 120. One end of the Y-shaped optical waveguide 80 is exposed to an end of the ridge member 14, and the other two ends of the Y-shaped optical waveguide 80 are exposed to an end of the planar member 12. In this embodiment, the Y-shaped optical waveguide 80 is made of a material selected from a group consisting of titanium, zinc and nickel.

Referring to FIGS. 2-8, a method for making the optical waveguide directional coupler 100, according to a second exemplary embodiment, is shown. The method includes the following steps.

Figure 2:
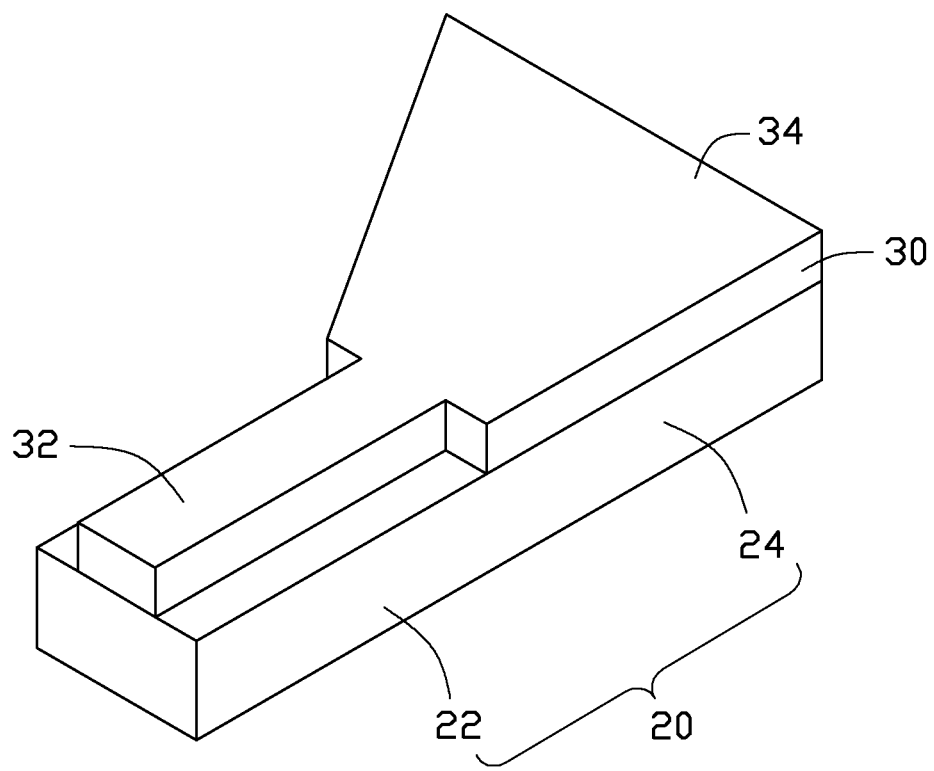
FIGS. 2-9 show steps of a method for making the optical waveguide directional coupler of FIG. 1, according to a second exemplary embodiment.

First, referring to FIG. 2, a substrate 20 and a first mask 30 are provided. Specifically, the substrate 20 is a planar plate and includes a first portion 22 and a second portion 24 connecting to the first portion 22. The first mark 30 includes a first shielding member 32 and a second shielding member 34 connecting to the first shielding member 32. The first shielding member 32 is elongated and positioned on the first portion 22 to cover a central portion of the first portion 22. The second shielding member 34 is positioned on the second portion 24 and entirely covers the second portion 24. That is, the shape of the second shielding member 34 is the same as that of the second portion 24. In this embodiment, the substrate 20 is made of a material selected from a group consisting of silicon and lithium niobate.

Figure 3:
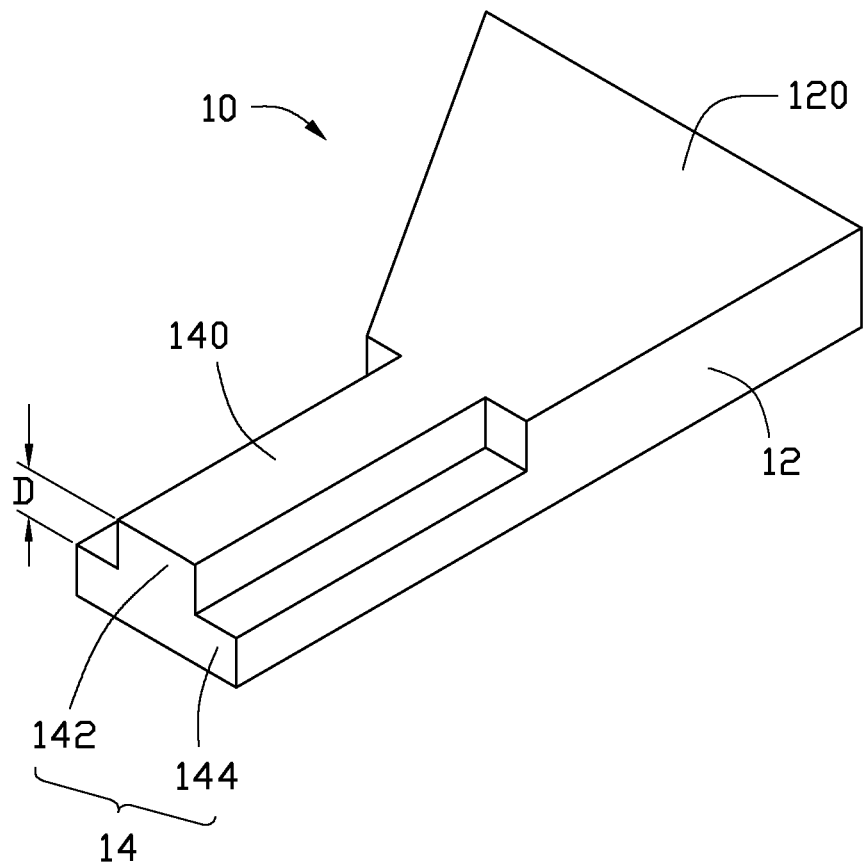

Second, referring to FIG. 3, a base 10 is obtained by etching the substrate 20 to a certain thickness using the first mask 30. In detail, the first portion 22 of 3-4 μm uncovered by the first shielding member 32 is removed. Thus, the base 10 includes a planar member 12 and a ridge member 14 perpendicularly extending from a side of the planar member 12. The planar member 12 is a plate and includes a planar top surface 120. The ridge member 14 includes a raised portion 142 and a recessed planar portion 144. The raised portion 142 is elongated and raised relative to the recessed planar portion 144. The raised portion 142 perpendicularly extends from the recessed planar portion 144 and the planar member 12, and has a planar upper surface 140. The upper surface 140 is coplanar with the top surface 120. To increase the etching speed, the etching solution is composed of HF and $HNO_3$ having a molar ratio of 1:2. The height D of the raised portion 142 relative to the recessed planar portion 144 is in a range from 3 μm to 4 μm.

Figure 4:
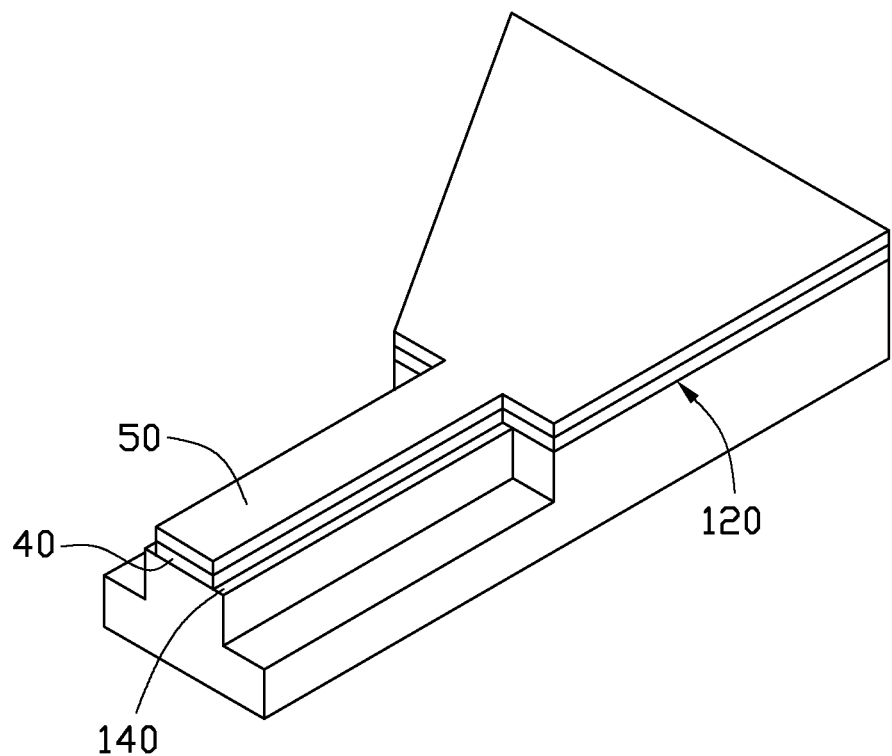

Third, referring to FIG. 4, an optical guiding layer 40 is formed on a part of the upper surface 140 and the entire top surface 120. In this embodiment, the optical guiding layer 40 is made of a material selected from a group consisting of titanium, zinc and nickel, and the thickness of the optical guiding layer 40 is in a range from 0.6 μm to 0.8 μm.

Fourth, referring to FIG. 4, a photo-resist layer 50 is formed on the entire optical guiding layer 40.

Figure 5:
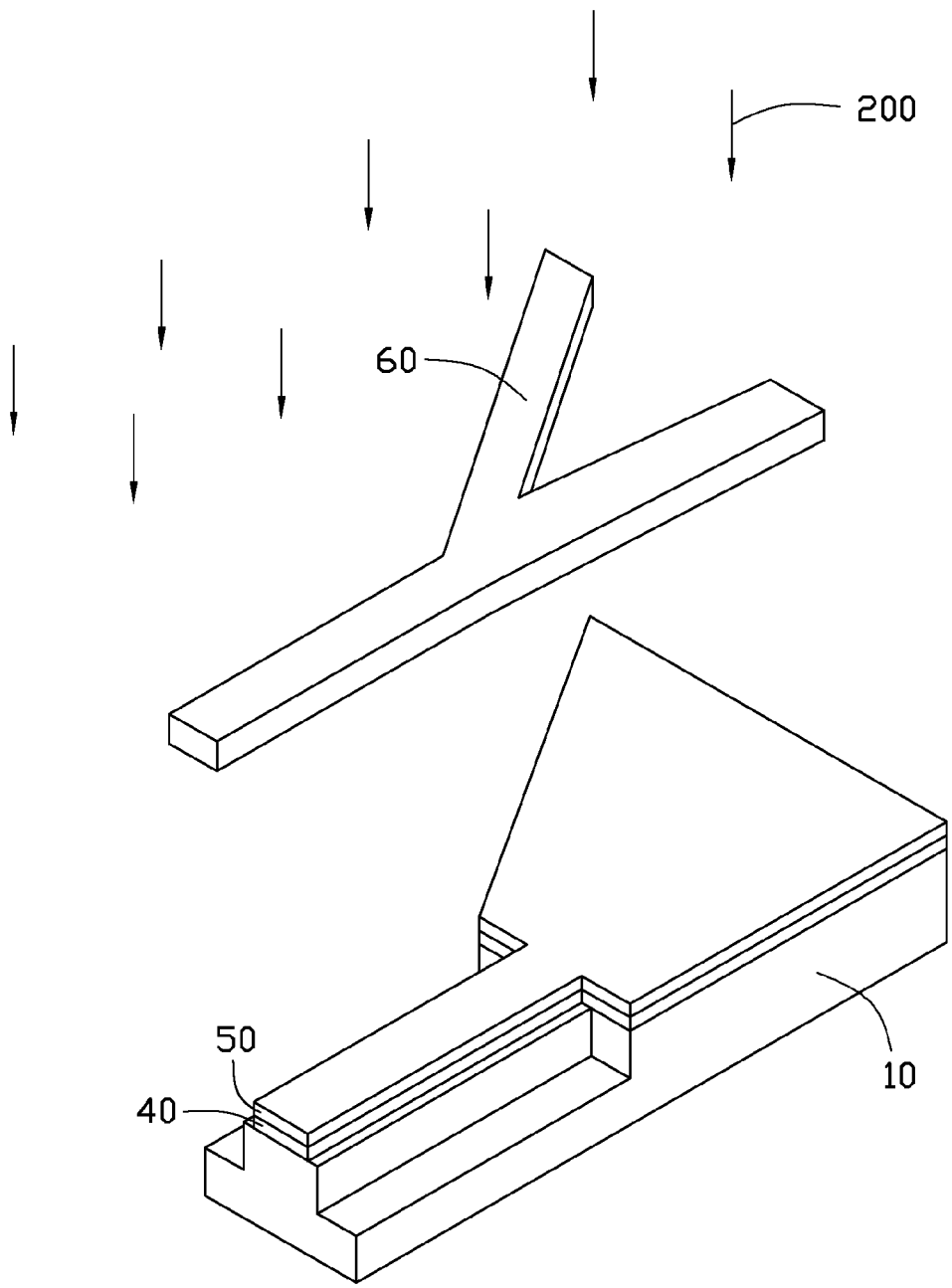
Figure 6:
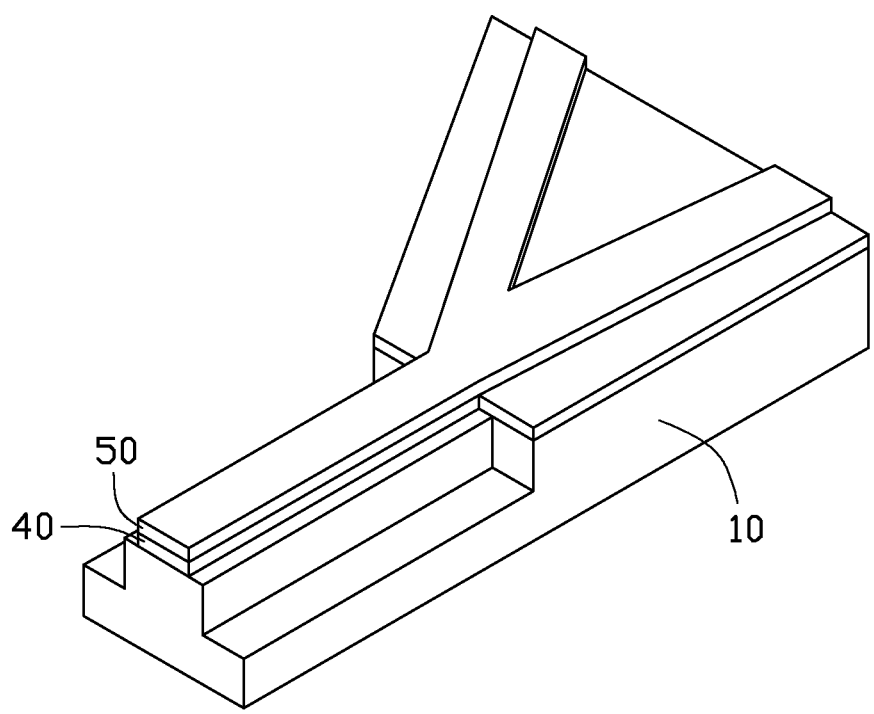

Fifth, referring to FIGS. 5-6, a Y-shaped photo-resist layer 50 is formed. In detail, a Y-shaped second mask 60 is placed over the photo-resist layer 50. Then, the photo-resist layer 50 is exposed to light beams 200 using the second mask 60. The photo-resist layer 50 is developed, thereby obtaining a Y-shaped photo-resist layer 50 on the optical guiding layer 40.

Figure 7:
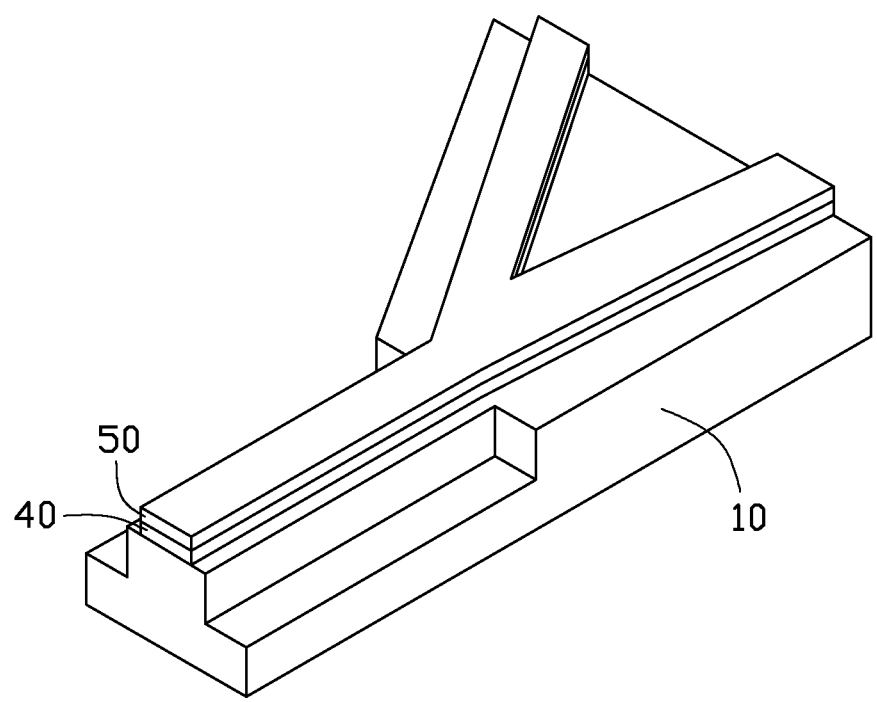

Sixth, referring to FIGS. 6-7, the optical guiding layer 40 is etched to obtain a Y-shaped optical guiding layer 40.

Figure 8:
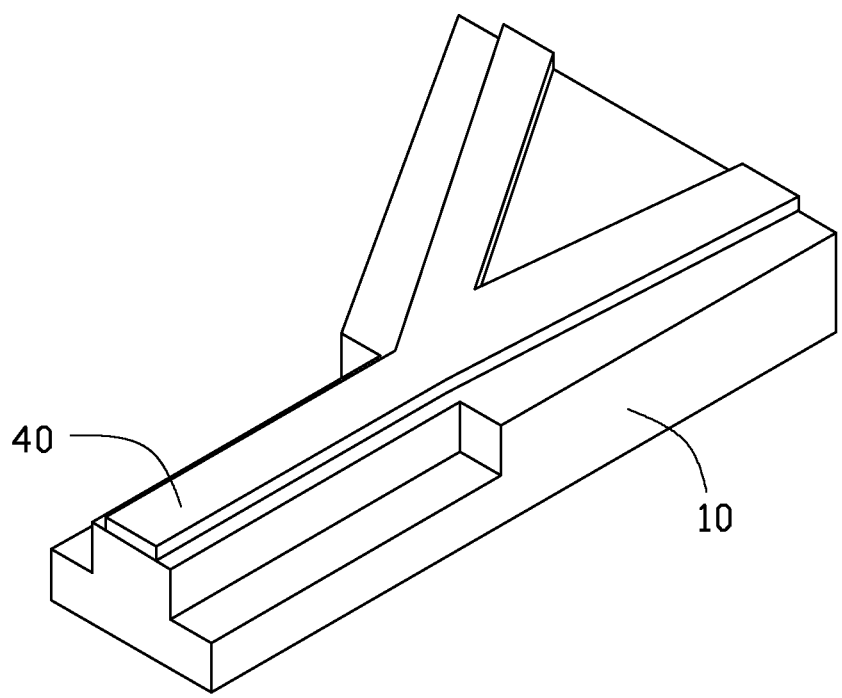

Sixth, referring to FIGS. 7-8, the Y-shaped photo-resist layer 50 is removed.

Figure 9:
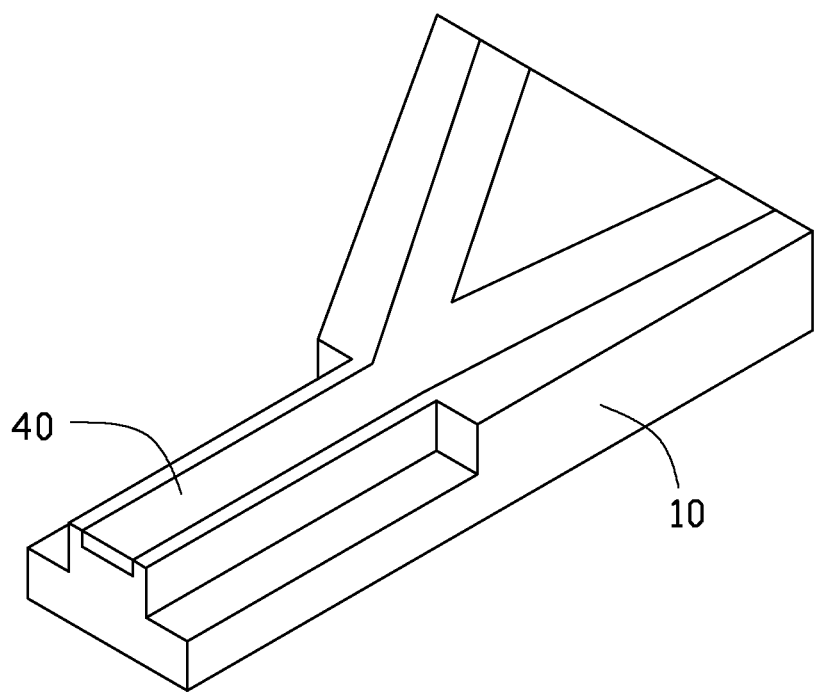

Seventh, referring to FIGS. 8-9, the base 10 and the Y-shaped optical guiding layer 40 are heated to diffuse the Y-shaped optical guiding layer 40 in the base 10, thereby the optical waveguide directional coupler 100 with the Y-shaped optical waveguide 80 (shown in FIG. 1) is achieved.

During the above steps of the method for making the optical waveguide directional coupler 100, an included angle of ends of "Y" to within about 1 degree of the ridge member 14 is not required, and an included angle of ends of "Y" to within about 1 degree of the optical guiding layer 40 is more easily achieved by the etching process because the optical guiding layer 40 (the thickness of the optical guiding layer 40 is 0.6-0.8 μm) is thin enough relative to portions of the planar member 12 which need to be etched to form a Y-shaped ridge (the thickness of the portions of the planar member 12 needed to be etched is 3-4 μm). Thus various product defects, such as a split product or an unwanted angle in a product, are avoided.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A method for making an optical waveguide directional coupler, comprising:

providing a base, the base comprising a planar member and a ridge member extending from a side of the planar member, the planar member comprising a top surface, the ridge member comprising a recessed planar portion and a raised portion raised relative to the recessed planar portion and perpendicularly extending from the planar member, the raised portion having an upper surface coplanar with the top surface;

forming an optical guiding layer on a part of the upper surface and the entire top surface;

forming a photo-resist layer on the entire optical guide layer;

forming a Y-shaped photo-resist layer on the optical guiding layer;

etching the optical guiding layer to obtain a Y-shaped optical guiding layer;

removing the Y-shaped photo-resist layer from the optical guiding layer; and heating the base and the Y-shaped optical guiding layer to diffuse the Y-shaped optical guiding layer in the base, thereby forming an optical waveguide directional coupler with a Y-shaped optical waveguide.

2. The method as claimed in claim 1, wherein the step of providing the base comprises:

providing a substrate and a first mask; and etching the substrate to a certain thickness to obtain the base using the first mask.

3. The method as claimed in claim 2, wherein the step of forming the Y-shaped photo-resist layer comprises:

placing a Y-shaped second mask over the photo-resist layer;

exposing the photo-resist layer using the second mask; and developing the photo-resist layer.

4. The method as claimed in claim 1, wherein the base is made of a material selected from a group consisting of silicon and lithium niobate.

5. The method as claimed in claim 1, wherein the optical guiding layer is made of a material selected from a group consisting of titanium, zinc and nickel.

6. The method as claimed in claim 1, wherein the height of the raised portion relative to the recessed planar portion is in a range from 3 μm to 4 μm.

7. The method as claimed in claim 1, wherein the thickness of the Y-shaped optical guiding layer is in a range from 0.6 μm to 0.8 μm.

* * * * *